US012140501B1

(12) United States Patent
Hever et al.

(10) Patent No.: US 12,140,501 B1
(45) Date of Patent: Nov. 12, 2024

(54) SINGLE PASS AUTOMATED VEHICLE INSPECTION SYSTEM AND METHOD

(71) Applicant: UVeye Ltd., Tel Aviv (IL)

(72) Inventors: Ohad Hever, Maccabim-Reut (IL); Amir Hever, Tenafly, NJ (US)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 18/613,183

(22) Filed: Mar. 22, 2024

(51) Int. Cl.
*G01M 17/02* (2006.01)
*G01N 21/88* (2006.01)

(52) U.S. Cl.
CPC ...... *G01M 17/027* (2013.01); *G01N 21/8806* (2013.01); *G01N 21/8851* (2013.01); *G01N 2021/8841* (2013.01)

(58) Field of Classification Search
CPC ............... G01M 17/027; G01N 2021/8841
See application file for complete search history.

(56) References Cited

U.S. PATENT DOCUMENTS

| | | | | |
|---|---|---|---|---|
| 7,102,665 B1 * | 9/2006 | Chandler | ........... | G01N 21/8806 |
| | | | | 382/104 |
| 11,293,751 B2 * | 4/2022 | Johnson | ............... | G01B 5/0004 |
| 11,550,077 B2 * | 1/2023 | Morton | .................... | G01V 5/22 |
| 11,707,948 B2 * | 7/2023 | Shklyar | ............... | G01M 17/027 |
| | | | | 73/146 |
| D1,017,076 S * | 3/2024 | Im | ................................ | D25/56 |
| 2004/0232054 A1 * | 11/2004 | Brown | ...................... | G01V 5/20 |
| | | | | 209/552 |
| 2006/0170768 A1 * | 8/2006 | Riley | ...................... | H04N 7/181 |
| | | | | 348/143 |
| 2007/0296961 A1 * | 12/2007 | Sekine | ................ | G01M 11/067 |
| | | | | 356/213 |
| 2015/0268132 A1 * | 9/2015 | Luther | .................... | G01B 11/22 |
| | | | | 356/631 |
| 2017/0186247 A1 * | 6/2017 | Thorley | ................. | G07C 5/006 |
| 2018/0059029 A1 * | 3/2018 | Yeum | ...................... | G01N 21/95 |
| 2018/0075675 A1 * | 3/2018 | Kim | .......................... | G01S 7/40 |
| 2019/0018134 A1 * | 1/2019 | Park | ...................... | G01M 17/007 |
| 2019/0056479 A1 * | 2/2019 | Park | ...................... | G01S 7/4026 |
| 2019/0304100 A1 * | 10/2019 | Hever | .................. | G06V 10/761 |
| 2019/0391233 A1 * | 12/2019 | Park | ...................... | H01Q 1/3233 |
| 2020/0096606 A1 * | 3/2020 | Okubo | .................... | G01B 11/26 |
| 2020/0096607 A1 * | 3/2020 | Okubo | ............... | G01B 11/2755 |
| 2020/0240874 A1 * | 7/2020 | Utting | ...................... | B60S 3/042 |
| 2021/0090242 A1 * | 3/2021 | Hever | ...................... | G06T 7/246 |
| 2021/0155055 A1 * | 5/2021 | Nevin | .................. | B60C 11/246 |
| 2021/0174117 A1 * | 6/2021 | Hever | .................... | H04N 7/181 |

(Continued)

Primary Examiner — Eric S. McCall

(57) ABSTRACT

A vehicle inspection system that images and assesses an automobile or truck during a single passage through an inspection area. Undercarriage, tire, and body imaging assemblies activate at coordinated times to optimally capture photos detailing the vehicle underbody, wheel, and profile views. The system improves imaging precision through targeted illumination and sensor arrays tailored to respective inspection zones. A computational core synchronizes aggregate sensor output to amalgamate a comprehensive perspective of the vehicle with minimized throughput timing. Automated analysis then identifies any defects, wear, or damage across imaging clusters. The system facilitates expedited assessment to categorize large vehicle pool conditions via an integrated mechanics-free apparatus requiring only conventional operator access.

15 Claims, 2 Drawing Sheets

(56) References Cited

U.S. PATENT DOCUMENTS

Figure 1:
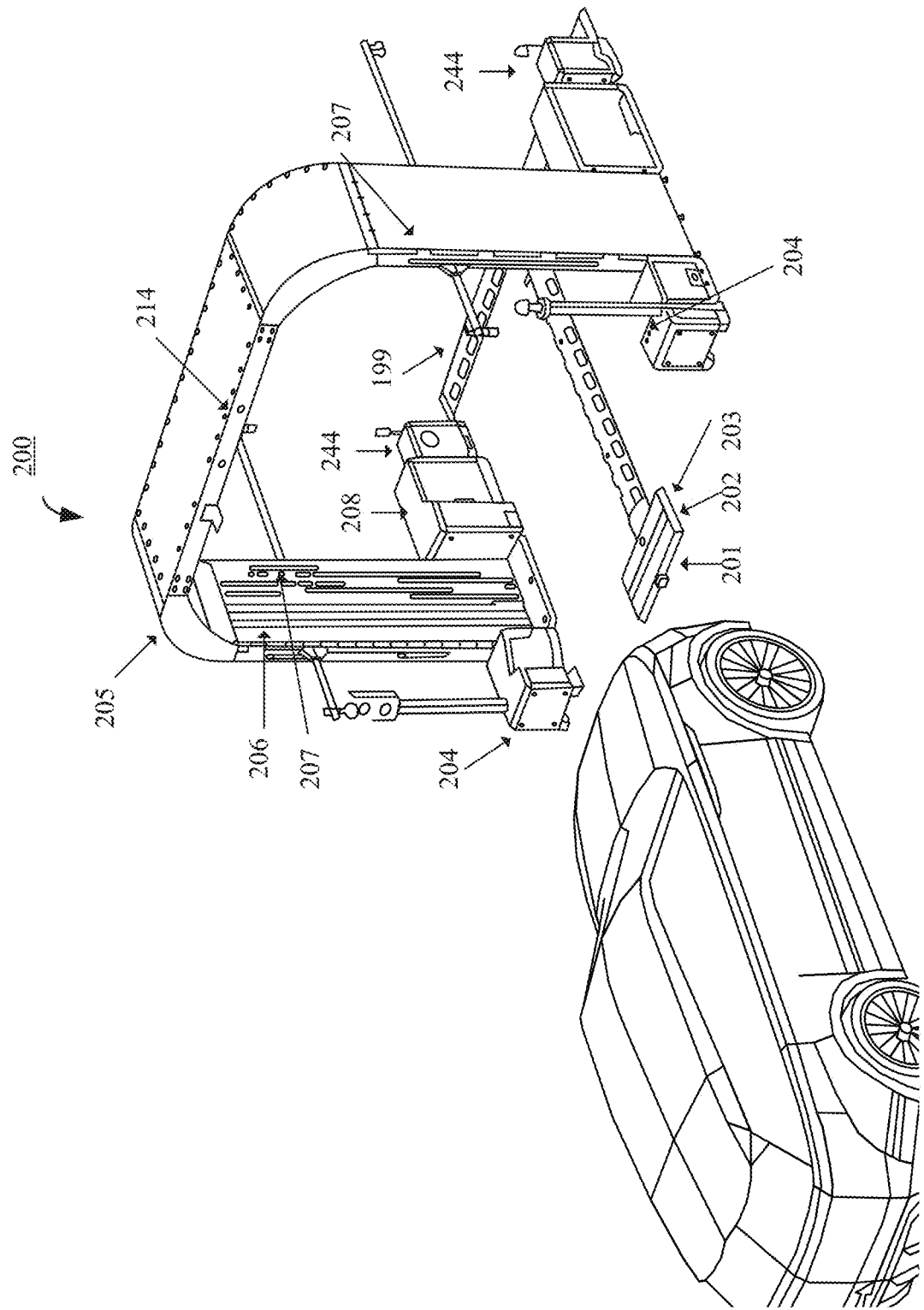

| | | | |
|---|---|---|---|
| 2021/0287460 A1* | 9/2021 | Aono | G07C 5/008 |
| 2021/0358235 A1* | 11/2021 | Kwon | B60Q 1/44 |
| 2022/0057481 A1* | 2/2022 | Aono | G01S 7/40 |
| 2022/0260458 A1* | 8/2022 | Mian | G01N 21/95 |
| 2022/0283274 A1* | 9/2022 | Kim | G01S 17/931 |
| 2022/0402515 A1* | 12/2022 | Aono | B60W 60/001 |
| 2023/0342937 A1* | 10/2023 | Hever | G06V 10/255 |
| 2024/0133772 A1* | 4/2024 | Dangur | G06Q 10/06395 |
| 2024/0169515 A1* | 5/2024 | Bardiya | G01B 11/14 |

* cited by examiner

SINGLE PASS AUTOMATED VEHICLE INSPECTION SYSTEM AND METHOD

FIELD AND BACKGROUND OF THE INVENTION

The present invention, in some embodiments thereof, relates to an automated vehicle inspection system and method and, more particularly, but not exclusively, to a single pass automated vehicle inspection system and method.

Manual vehicle inspections are time consuming, subjective, and prone to human error. Mechanical systems have been created to automate parts of the inspection process but possess a number of limitations.

Some automated systems use optical sensors or cameras to capture images of a vehicle for analysis. These cover certain vantage points of the vehicle such as the undercarriage or sides, requiring multiple scans from different orientations to fully inspect a vehicle. Safety is also a concern when maneuvering certain vehicles.

SUMMARY OF THE INVENTION

The present invention relates to a system and method for performing comprehensive vehicle inspections in a rapid, efficient manner using synchronized imaging of the undercarriage, tires, and body during a single pass of the vehicle along an inspection route.

In one aspect, some embodiments of the invention provide a vehicle inspection system comprising an under vehicle scanning assembly with undercarriage lighting and sensors to capture undercarriage images, left and right tire inspection sensors to capture images of tire treads in the backsides of the tires, and a vehicle body scanning assembly with body lighting and left and right sensors to capture side body images. A controller synchronizes the capturing or selection of the images and performs an analysis to inspect the vehicle based on the captured images from a single pass.

The system may further include a roof sensor to capture images of the vehicle's roof, and the roof sensor and side sensors may be mounted on an arch assembly. At least one presence sensor can detect the vehicle's arrival at a predefined location to trigger image capturing or selection.

The controller may synchronize capturing of tire tread images at a different time than capturing undercarriage or body images. It can also localize defects or cluster image subgroups for defect detection based on the synchronization.

Additional features may include lateral tire inspection sensors, a detector to operate undercarriage lighting when the vehicle covers it, synchronization of body lighting and image capturing to reduce glare, and synchronized tire lighting.

In another aspect, some embodiments of the invention provide a method for performing vehicle inspection by activating the undercarriage lighting and sensors, tire inspection sensors, and body lighting and sensors to capture respective images during a single pass of the vehicle, and using a controller to synchronize image capturing or selection and perform an inspection analysis.

The method may further include analyzing the images to identify damage, wear, or defects and generating an inspection report documenting the findings.

Another aspect of some embodiments of the invention provide an alternative system configuration for a single continuous cross of the vehicle along a driving path, including an under vehicle scanning assembly, opposite left and right tire inspection sensors, and a vehicle body scanning assembly positioned between them. A controlling circuit synchronizes image capturing or selection and performs an analysis on the captured images.

Embodiments of present invention provides an efficient, comprehensive vehicle inspection system and method utilizing synchronized imaging of key vehicle areas in a single pass where the method may be based on using the described system.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
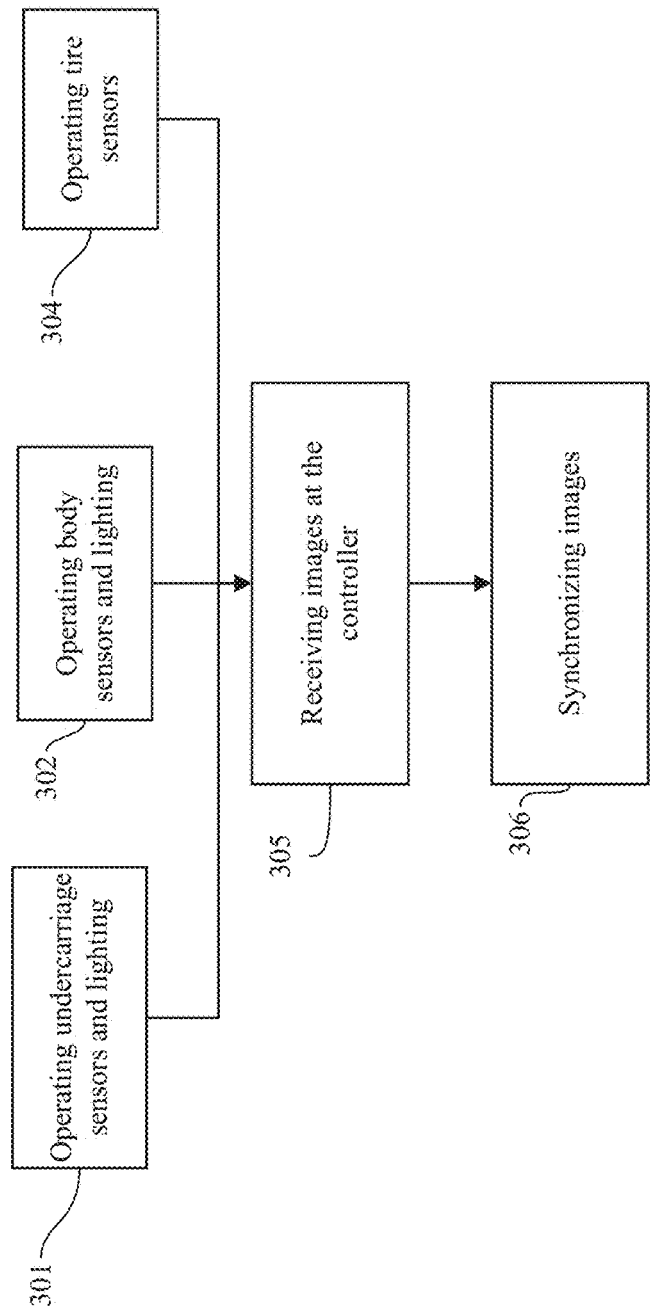

In the drawings:

FIG. 1 illustrates a view of an overall vehicle inspection system layout, according to some embodiment of the present invention; and FIG. 2 is a flowchart of operating the vehicle inspection system described with reference to FIG. 1, according to some embodiment of the present invention.

DESCRIPTION OF SPECIFIC EMBODIMENTS OF THE INVENTION

The present invention, in some embodiments thereof, relates to an automated vehicle inspection system and method and, more particularly, but not exclusively, to a single pass automated vehicle inspection system and method.

Some automated systems use optical sensors or cameras to capture images of a vehicle for analysis. However, these are typically limited to certain vantage points of the vehicle such as the undercarriage or sides, requiring multiple scans from different orientations to fully inspect a vehicle. This leads to slow and complex processes needing accurate vehicle positioning or manipulation equipment (lift, dolly, etc) to relocate the car between scans. Safety is also a concern when maneuvering certain vehicles.

Other systems use mirrors or borescopes to view enclosed areas of the vehicle such as the interior of tire treads. But the field of view is often constrained and obstructions can easily interfere with image capture. Identifying subtle or hidden defects like small cracks or rust is challenging with these tools.

Many existing inspection mechanisms only generate snapshots of a vehicle in time, making dynamic problems hard to identify. Synchronizing data between different systems or capturing simultaneous vehicle interactions between components like the undercarriage and suspension when in motion is an unmet need.

There is demand across various sectors from vehicle auctions to border security for an automated inspection system that can quickly and reliably scan multiple areas of a vehicle in detail without requiring too much inspection space. A complete system capable of capturing synchronized images of a vehicle's undercarriage, tires, and body in a limited space during single pass motion addresses limitations is required. Integrated image analysis further leverages the scanning capabilities to accurately detect damage, wear and other issues.

To overcome the above challenge, in some embodiments of the present application, there is provided a teaching for a system for automated vehicle inspection comprising multiple imaging sensors to capture images of the undercarriage, tires, and body of a vehicle during a single pass of the vehicle through an inspection area having a length smaller than a length of an average European private car. Image capturing and lighting are optionally synchronized and analyzed by a controller to identify any damage, wear or other issues with the vehicle.

In some embodiments the system includes an under vehicle scanning assembly with undercarriage lighting to illuminate the undercarriage and one or more undercarriage sensors to capture images as the vehicle passes over the sensors along an inspection route. Left and right tire inspection sensors located on opposite sides of the route capture images of the vehicle's tires when they pass a trigger line. Between the undercarriage sensors and tire trigger line is a vehicle body scanning assembly comprising body lighting and left and right sensors capture images of the sides of the vehicle body. A controller synchronizes the images from the various sensors and assemblies and performs automated analysis of the undercarriage, tires, and body to identify any issues or damage.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a view of an overall vehicle inspection system 200 layout, according to some embodiment of the present invention. The system components are arranged in a limited space along an inspection route that vehicles follow during the inspection process.

On the starting line of an inspection route is the under vehicle scanning assembly 201 which includes the undercarriage lighting 202 and undercarriage sensors 203 embedded in the roadway that vehicles drive over. The undercarriage sensors 203 extend across multiple lanes to capture images of the vehicle undercarriages. The undercarriage sensors 203 may include a high resolution industrial machine vision cameras positioned beneath transparent roadway sections to capture images upwards towards vehicle undercarriage.

The system may incorporate detectors installed above the undercarriage lighting (202) components to identify when a vehicle is physically positioned directly overhead, defined as a covering event. These detectors may involve simple beam break sensors or other proximity switches to recognize the chassis blocking ambient illumination.

By integrating the capability to sense the covering condition, a controller (described further below) may activate and deactivate undercarriage lighting (202) operation only during spans when illumination can actually reach and reflect from vehicle underbodies. This selective undercarriage lighting (202) powering coordinated with dynamic covering events conserves energy usage that would otherwise be wasted emitting illumination outward when no underside surfaces are present to inspect As referred to herein, an inspection route maybe any part of an inspection route. The limited space wherein the system is deployed has a length, parallel to the inspection route, of less than an average car length, for example less than 5 meters. Optionally, the length is less than 3.5 meters, for example 3 meters, facilitating the location of the system along limited inspection areas.

Further down the inspection route is a tire inspection trigger line 199. Positioned on opposite sides of the route at this trigger line are left and right tire inspection sensors 204. These sensors 204 face inward to capture images of the backsides of the vehicle's tires when they pass the trigger line. The left and right tire inspection sensors (204) may include wide dynamic range machine vision cameras angled inwards along vehicle direction pathway to capture entire tread faces and optionally off-axis ring lights surrounding each camera for glare-free tire sidewall illumination. Optionally, a distance between a line between the left and right tire inspection sensors 204 and the tire inspection trigger line 199 is about 2 meters, facilitating the used left and right tire inspection sensors to operate optimally when capturing an image of all the treads of the front tires from a diagonal back angle for example as depicted in FIG. 1.

In between the under vehicle scanning assembly 201 and tire inspection trigger line is the vehicle body scanning assembly 205. This assembly 205 includes body lighting units 206 positioned on both sides to illuminate the vehicle bodies. Additionally, left and right sensors 207 capture images of the respective left and right sides of the vehicle bodies as they pass through the assembly 205. The body lighting units 206 may include one or more LED strip lights or light towers with diffusers located around sides of vehicle inspection area. The left and right sensors 207 maybe digital SLR cameras paired with telephoto lenses or off-axis machine vision cameras to capture images of vehicle sides.

The system further comprises a controller 208, for instance a controlling circuit, which receives the images from all the system sensors and assemblies and runs analysis software to identify any issues or damage on the undercarriage, tires, or body. The controller 208 synchronizes the images and inspections for each vehicle during its single pass along the automated inspection system. The controller 208 may be any computer or integrated circuit, for instance one or more microcontrollers, a central processing unit(s), and an industrial computer with multicore processor, solid state storage, redundant power supplies, fieldbus interfaces and rugged enclosure. The controller may include analog and digital signal processing hardware for aggregating data streams from sensors. The controller executed software algorithms for synchronizing images temporally based on timestamps and locations.

Optionally, the controller 208 implements specialized image capture synchronization utilizing pulse width modulation PWM signals to regulate the vehicle body lighting 206. By rapidly cycling the body lighting 206 on and off out-of-phase with the left side sensor 207 and right side sensor 207 exposures, potential glare sources can be mitigated in the inspection region. Rather than continuously illuminating the entire inspection duration which could introduce blown out highlights and loss of detail, the pulsed lighting concentrates on brief peak intensity bursts. As an example, the body lighting 206 may switch on for 50 millisecond pulses at only 70% duty cycle. The left and right sensors 207 time their imaging to the narrow off-phase intervals where lighting has cycled off. This creates lower ambient conditions suited for the camera sensor characteristics while still providing ample updated illumination for new vehicle bodies entering the field of view. By tuning the pulse profile characteristics, optimal contrast balanced with exposure brevity is maintained to eliminate glare artifacts across both inspection lighting and imaging components. The controller 208 can further adjust pulse parameters in real-time if ambient environment conditions change. This PWM-based synchronization refines imaging clarity.

Optionally, in addition to the undercarriage lighting 202 and body lighting 206, dedicated tire lighting illuminators are positioned at the tire inspection trigger line area. These tire lighting units may activate synchronized flashes in coordination with the left and right tire inspection sensors 204 as well as the left 207 and right 207 side body sensors. By synchronizing operation with both tire, body, and undercarriage image capturing, uniform lighting conditions may be provided to increase image quality across all inspection sensor data feeds. The tire lighting pulses can match the field rate of respective tire cameras for motion freeze frame clarity, while still enabling body sensors keyed to alternative phase offsets to control lighting glare and sensor blooming.

Additionally, timed tire illumination activated concurrent to undercarriage shots from a similar vehicle axis orientation helps associate tire condition with aligned suspension or wheel well configurations during automated defect analysis performed after the single vehicle pass. The supplemental synchronized tire lighting may enhance images both at the time of initial capture as well as improving post-processing correlation between inspection zones.

Optionally, the assembly 205 includes a roof sensor 214, such as a roof scanning camera. This roof sensor would be situated above the left 207 and right 207 side scanning cameras in order to capture images of the vehicle roof as the car, truck or other vehicle type passes under the arch assembly through the inspection area. The roof camera images would be transmitted to the controller 208 along with the undercarriage, tire and side images for inclusion in the synchronized analysis process. Potential defects such as dents, rust or leaked fluids could then be identified on the roof sections of inspected vehicles. The roof sensor maybe a wide-angle machine vision camera mounted overhead through an environmental enclosure. Optionally the assembly arc is less than 3.5 meters wide, for example 3.3 meters wide perpendicularly to the inspection route. Optionally the assembly arc is less than 3 meters high, for example 2.5 meters above a ground level of the inspection route.

Optionally, the vehicle body scanning assembly 205 utilizes a physical arch structure spanning over the inspection route to position the left, right and roof scanning cameras at a suitable overhead height and orientation. This arched framework increases coverage while enabling adjustable camera placements, lighting and backgrounds as needed to optimize image quality for accurate vehicle inspections. Open architecture also facilitates access, maintenance and component swapping.

Optionally, arrival sensing, inductive loops or optical sensors embedded before and along the inspection route could be utilized to detect a vehicle's presence. By triggering at key locations when a car or truck enters the scanning zone these presence detectors provide event signals to indicate the start of a new inspection cycle to the controller. This facilitates precise automated activation and synchronization of undercarriage, tire, body and roof image capturing without needing additional user input or control.

In addition to the previously described left and right tire inspection sensors 204 situated inwards to capture images of the rear-facing tread sidewalls as vehicles cross the trigger line, the system may also incorporate left and right lateral tire sensors 244 on opposite sides along the inspection route, for instance near presence sensors used for detecting the arrival of the front tires to the trigger line. These lateral sensors would face to image the exterior vehicle tire sidewalls and outer tread faces visible from outside the wheel assemblies.

The lateral tire sensors provide overlapping imaging coverage and multiple sight angles of both left and right tires during inspection. By locating the lateral sensors across from one another near the established tire trigger line transverse to traffic flow, synchronized images of the complete visible tire circumference are attainable without needing to reposition the vehicle. The variety of tread face perspectives better highlights any potential tire defects or damage that could be obscured from just the initial rear inward tire views. All captured lateral and rear tire images are transmitted to the system controller 208 for compilation into a comprehensive tire inspection data set tied temporally to the undercarriage and body images of a specific vehicle during its single automated inspection pass.

It should be noted that the sensors and detectors integrated throughout the vehicle inspection system may utilize standardized digital interfaces and network protocols for reliable connectivity with the controller 208). For the undercarriage sensors 203, left/right tire inspection sensors 204, left/right body sensors 207 and any supplemental cameras, standardized machine vision GigE interfaces may be implemented. These industry-standard Ethernet-based interfaces provide high bandwidth to transmit captured imagery at full sensor resolution and frame rates with low latency while leveraging cost-effective physical cabling. The variety of presence, proximity, pressure and other environmental detectors distributed adjacent to the inspection route leverage common industrial communication protocols like CAN bus or Modbus. CAN bus provides arbitration and priority messaging for real-time signals like arrival sensors. Modbus uses RS-485 serial for cost-efficiency over longer runs to interior detectors. These digital networks consolidate signals over fewer conduit paths compared to individual wired I/O. All the sensor and detector communication channels route through managed switches to provide redundancy options before terminating into the controller 208 server cluster. The controllers implement complementary interface cards, such as Gigabit Ethernet adapters and CAN bus cards, to ingest and consolidate the incoming sensor data feeds.

A key benefit of the above described system's configuration is the ability to perform comprehensive inspections without requiring a large footprint or extensive tunnels, gantries and conveyors. By leveraging recent advances in high-resolution, high-speed imaging components, sufficient vehicle scanning fidelity can be achieved in a fraction of prior hydraulic lift bays and multi-stage mechanical inspection tooling. The under vehicle scanning assembly 201 exemplifies space optimization with undercarriage sensors 203 and illumination 202 hardware embedded cleanly into roadway sections, avoiding obtrusive arms or aperture assemblies.

The vehicle body scanning assembly 205 takes advantage of lightweight composite or non-ferrous framing to cantilever an arched framework over the inspection lane, optionally at narrow 4 meter width or less, for example 3.3 meters. The elevated arch assembly consolidates left, right and roof scanning cameras plus illumination into under 2.5 meters of height to avoid collision obstacles for accepted vehicle classes.

By contrast, surround tunnel configurations require substantially larger commercial-grade facilities and extended, dedicated real estate unsuitable for ad hoc usage. Length can also balloon if conveyors or secondary cells are involved. The present layout's reduced magnitude along the vehicle process path through integrated components enables portable implementations viable in approximately 3 meters of linear runout.

By controlling the operation of the lighting units and timing the capturing of the images, the distance between the under vehicle scanning assembly, the left and right tire inspection sensors, and the vehicle body scanning assembly can be deployed along a path of less than 3.5 meters, for instance 3 meters. Specifically, the controller 208 activates the under vehicle scanning assembly 201 undercarriage lighting 202 and the the body scanning assembly 205 lighting 206 during different windows when the vehicle's undercarriage is physically positioned over the assembly 201 and within the assembly arc. As the lighting units are operated to pulse intense illuminations at the right time while the vehicle is moving, no bulk of lighting hardware is needed and the assembly's 201 size can be minimized.

By freeze-framing the vehicle through precision bursts, shorter exposure intervals freeze motion and remove blurring that would otherwise dictate extended acceleration/deceleration zones exceeding 5+ meters for smooth vehicle flow. Strobing light for fractions of a second enables reliable imaging at faster speeds.

Likewise, the controller 208 signals the tire inspection sensors 204 to activate exposures when vehicle movement aligns its wheel assemblies squarely in the camera field of view, optionally in a coordinated manner with the other lighting units, for instance when they are not flashing or pulsing light. This coordination deliberately spaces out sensor triggering rather than demanding substantial continuous-feed traverse distances.

Overall, the control logic condenses the effective functional distances between assemblies by enabling only essential imaging at selective locations instead of uniformly emitting lighting or imaging along lengthy tracks. This intelligent sequencing compresses hardware footprints while still delivering full inspection synthesis. By calculating travel distance between assembly locations, about a 3 meter system path may provide adequate interleaving tolerance to capture synchronized inspection imagery. Greater spacing risks unaligned disparate perspective assembly fusion.

Thus by commanding illumination durations and discriminating sensor imaging coordination, the controller 208 facilitates packing assembly sequences within confined 3.5 meter or less envelopes without sacrificing inspection coverage.

In total, the system framework delivers complete inspection capabilities concentrated in readily deployable scalable units. A capable embodiment can assemble in a lightweight trailer-towable package adjustable on site for rapid installations supporting key applications like temporary checkpoints. As the sensors of the system are located close to one another along a vehicle path, to inspect a single vehicle from start to finish during a single synchronized imaging process, the system can fully inspect a vehicle within less than 20 seconds, for instance, within 10-15 seconds.

Reference is also made to FIG. 2 which is a flowchart of a process for performing an automated vehicle inspection using the system layout shown in FIG. 1, according to some embodiments of the present invention.

First, as shown at 301, as a vehicle passes over the under vehicle scanning assembly 201, the undercarriage lighting 202 illuminates the vehicle undercarriage while the undercarriage sensors 203 capture multiple images of the undercarriage. Undercarriage lighting 202 may include one or more LED strip lights or flood lights to evenly illuminate underside of vehicles.

As shown at 302, the vehicle then passes through the vehicle body scanning assembly 205 located between the undercarriage sensors 201 and tire trigger line. The body lighting 206 illuminates the vehicle's sides while the left and right sensors 207 capture multiple images of the respective left and right sides of the vehicle body.

Next, as shown at 304, as the vehicle's tires pass over the tire inspection trigger line, the left and right tire inspection sensors 204 positioned on opposite sides of the route activate to capture images of the backsides of the respective left and right tires to inspect the tire treads.

As shown at 305, the controller 208 receives the images from all the sensors and assemblies. In 306, it synchronizes the images so that undercarriage, tire, and body images correspond to a single pass of a vehicle through the system. The controller 208 then runs analysis on the images to identify any damage, wear or other issues with the vehicle's undercarriage, tires, or body.

By capturing images of the undercarriage, tires, and body concurrently as the vehicle passes through the inspection route, the system can perform a full vehicle inspection including analysis on the synchronized images.

A key advantage and improvement provided by the above described system or method is the ability to fully inspect the undercarriage, tires, and all sides of the vehicle body and optionally roof in a single pass of the vehicle along the automated inspection route.

Having all the sensors synchronized and images captured concurrently rather than sequentially saves significant time compared to introducing a vehicle multiple times into an inspection bay or cell. Some benefits of the single pass approach include higher vehicle throughput and faster inspections improve efficiency and scale when inspecting large vehicle fleets or high volumes at rental agencies, auctions or border crossings. Also potential for vehicle damage is reduced compared to systems requiring lifts, roller rigs or repetitive low-clearance manipulating equipment. Moreover, the system presents a system architecture focused in one inspection cell versus multiple stations where there is no need to reposition non-autonomous vehicles or accurately guide vehicles through multipass inspection configurations. By coordinating undercarriage lighting, overhead body/roof scanning, and precision-timed tire imaging during one motion of the vehicle through the automated system, full 360 degree inspection is achieved without reliance on manual labor or complicated apparatus. The synchronized images captured during the singular vehicle pass enable comprehensive analysis as well.

Optionally, the system includes at least one presence sensor near the inspection route that detects when a vehicle has arrived and communicates this to the controller (208). The controller uses this arrival event trigger to activate the image capturing process across the various sensors and assemblies. The presence sensors maybe inductive loops circuits buried underneath vehicle inspection path and/or sensors of infrared photoelectric beams spanning inspection area tuned for vehicle body detection.

Optionally, the controller 208 is configured to activate the various sensors at different times during the single vehicle pass in order to synchronize specific subsets of images. Optionally, images of the tire treads may be captured at a different time than images of the body or undercarriage. This allows the system to associate specific tire images with corresponding undercarriage or body images during the analysis process.

Similarly, images of the vehicle undercarriage may be captured at a different time than body images, with the controller synchronizing the images via their timestamps.

Optionally, to ensure optimal image quality and system performance, the controller performs synchronization between the overview cameras and the lighting units described above to provide consistent illumination. For example, the controller employs a synchronized flash and camera setup, using a powerful but short flash (10 milliseconds) that is precisely coordinated with the camera exposure. The camera exposure time is set to a brief 100-200 microseconds, for instance 125 microseconds. While this short exposure can result in darker images, the powerful synchronized flash compensates to deliver properly exposed and detailed images.

By synchronizing subsets of images captured at different times, the controller 208 may localize and identify defects on specific parts of the vehicle more accurately, such as correlating undercarriage damage with a dent on a vehicle's side panel. This facilitates a more detailed inspection and analysis to detect and cluster any vehicle defects.

It is expected that during the life of a patent maturing from this application many relevant sensors will be developed and the scope of the term a sensor is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system to perform vehicle inspection, comprising:
    an under vehicle scanning assembly consisting of:
        undercarriage lighting, and
        one or more undercarriage sensors to capture multiple undercarriage images of an undercarriage of a vehicle passing along an inspection route;
    left and right tire inspection sensors on opposite sides of the inspection route to capture images of tire treads in backsides of respective left and right tires when the tires pass a tire inspection trigger line along the inspection route;
    a vehicle body scanning assembly between the under vehicle scanning assembly and the tire inspection trigger line, consisting of:
        body lighting, and
        left and right sensors to capture multiple left and right side body images of a body of the vehicle when it passes along the inspection route;
    a controller to perform a vehicle inspection analysis of the vehicle by synchronizing the capturing and performing an analysis on the undercarriage, tires, and body images which are captured during a single pass of the vehicle along the inspection route.

2. The system of claim 1, wherein the vehicle body scanning assembly further comprises a roof sensor to capture images of a roof of the vehicle when it passes along the inspection route between the left and right sensors.

3. The system of claim 2, wherein the roof sensor and the left and right sensors are mounted on an arch assembly.

4. The system of claim 1, further comprising at least one presence sensor adapted to detect an arrival event indicative of an arrival of the vehicle to a predefined location along the inspection route; wherein the controller is adapted to perform the capturing based on the arrival event.

5. The system of claim 1, wherein during the single pass of the vehicle along the inspection route, the controller synchronizes capturing of the images of the tire treads at least one first time and capturing of the body images or the undercarriage at least one second time different from the at least one first time.

6. The system of claim 1, wherein during the single pass of the vehicle along the inspection route, the controller synchronizes capturing of the undercarriage images at at least one first time and capturing of the body images at at least one second time different from the at least one first time.

7. The system of claim 1, wherein the controller clusters subgroups of images for detecting one or more vehicle defects according to the outcome of the synchronization.

8. The system of claim 1, further comprising left and right lateral tire inspection sensors on opposite sides of the inspection route to capture images of lateral side of respective left and right tires and left and right lateral tire treads along the inspection route.

9. The system of claim 1, further comprising a detector to detect a covering event wherein the vehicle is above the undercarriage lighting; wherein the controller operates the undercarriage lighting in response to the detection of the covering event.

10. The system of claim 1, wherein the controller synchronizes between an operation of the body lighting and capturing of the left and right body images by the left and right sensors in a pulse width modulation (PWM) so as to reduce or eliminate glare.

11. The system of claim 1, further comprising tire lighting synchronized with an operation of capturing at least one of the left and right body images and the multiple undercarriage images.

12. A method for performing vehicle inspection, comprising: during a single pass of a vehicle along an inspection route:
  activating undercarriage lighting and one or more undercarriage sensors of an under vehicle scanning assembly to capture multiple undercarriage images of an undercarriage of a vehicle as the vehicle passes along an inspection route;
  activating left and right tire inspection sensors positioned on opposite sides of the inspection route to capture images of tire treads in backsides of respective left and right tires when the tires pass a tire inspection trigger line set along the inspection route;
  activating body lighting and left and right sensors of a vehicle body scanning assembly located between the under vehicle scanning assembly and the tire inspection trigger line to capture multiple left and right side body images of a body of the vehicle as it passes along the inspection route;
  using a controller to perform a vehicle inspection analysis of the vehicle by synchronizing the capturing and performing an analysis on the undercarriage, tire, and body images which are captured during the single pass of the vehicle along an inspection route.

13. The method of claim 12, further comprising analyzing the captured images to identify damage, wear or defects in the undercarriage, tires, or body.

14. The method of claim 12, further comprising generating an inspection report documenting identified damage, wear, or defects based on the analysis.

15. A system for performing a vehicle inspection, comprising:
  an under vehicle scanning assembly an comprising:
    an undercarriage lighting arrangement, and
    one or more undercarriage sensors mounted to capture a plurality of undercarriage images of an undercarriage of the vehicle during a single passage of the vehicle along the driving path;
  a left tire inspection sensor and a right tire inspection sensor mounted opposite to one another along the driving path that passes therebetween to capture respectively a left side tire image of a backside of a left side tire of the vehicle and a right side tire image of a backside of a right side tire of the vehicle when the left side tire and the right side tire cross a tire inspection trigger line during the single continuous passage of the vehicle along the driving path;
  a vehicle body scanning assembly, mounted between the under vehicle scanning assembly and the tire inspection trigger line and comprising:
    a body lighting arrangement, and
    one or more body left and right sensors mounted to capture respectively a plurality of left side images of a body of the vehicle and a plurality of right side images of the body of the vehicle during the single continuous passage of the vehicle along the driving path;
  a controlling circuit adapted to synchronize the capture and to perform a vehicle inspection analysis of the vehicle by performing an analysis on
  the plurality of undercarriage images, the left side tire image, the right side tire image the plurality of left side images, and the plurality of right side images.

* * * * *